(12) United States Patent
Ochi

(10) Patent No.: US 9,280,762 B2
(45) Date of Patent: Mar. 8, 2016

(54) ELECTRIC MAIL PROCESSING APPARATUS

(75) Inventor: Kengo Ochi, Tokyo (JP)

(73) Assignee: OKI DATA CORPORATION, Tokyo (JP)

( * ) Notice: Subject to any disclaimer, the term of this patent is extended or adjusted under 35 U.S.C. 154(b) by 956 days.

(21) Appl. No.: 12/646,187

(22) Filed: Dec. 23, 2009

(65) Prior Publication Data

US 2010/0174794 A1    Jul. 8, 2010

(30) Foreign Application Priority Data

Jan. 7, 2009   (JP) .................................. 2009-001738

(51) Int. Cl.
G06F 15/16     (2006.01)
G06Q 10/10     (2012.01)
H04N 1/00      (2006.01)
H04L 12/58     (2006.01)

(52) U.S. Cl.
CPC ........... *G06Q 10/107* (2013.01); *H04N 1/0014* (2013.01); *H04N 1/0023* (2013.01); *H04N 1/00212* (2013.01); *H04N 1/00233* (2013.01); *H04N 1/00244* (2013.01); *H04N 1/00312* (2013.01); *H04L 12/58* (2013.01); *H04L 12/585* (2013.01); *H04L 51/18* (2013.01); *H04N 1/00209* (2013.01)

(58) Field of Classification Search
CPC ................................................. H04N 1/00244
USPC ....................................................... 709/206
See application file for complete search history.

(56) References Cited

U.S. PATENT DOCUMENTS

| | | | | |
|---|---|---|---|---|
| 6,311,211 | B1 * | 10/2001 | Shaw et al. | 709/206 |
| 6,801,962 | B2 * | 10/2004 | Taniguchi et al. | 710/33 |
| 7,142,321 | B2 * | 11/2006 | Tomita et al. | 358/1.15 |
| 7,195,408 | B2 * | 3/2007 | Nishiguchi | 400/76 |
| 7,212,302 | B2 * | 5/2007 | Toyoda | 358/1.15 |
| 7,268,907 | B2 * | 9/2007 | Sato | 358/1.15 |
| 2001/0029531 | A1 * | 10/2001 | Ohta | 709/223 |
| 2002/0091781 | A1 * | 7/2002 | Yashiki | 709/206 |
| 2002/0097414 | A1 * | 7/2002 | Utsunomiya | 358/1.13 |
| 2002/0140960 | A1 * | 10/2002 | Ishikawa | 358/1.13 |
| 2002/0147646 | A1 * | 10/2002 | Ogura et al. | 705/14 |
| 2003/0025934 | A1 * | 2/2003 | Takamiya | 358/1.15 |
| 2003/0037115 | A1 * | 2/2003 | Tomita et al. | 709/206 |
| 2003/0038979 | A1 * | 2/2003 | Seki et al. | 358/402 |
| 2003/0095281 | A1 * | 5/2003 | Parry | 358/1.15 |
| 2003/0107762 | A1 * | 6/2003 | Kinoshita et al. | 358/1.15 |

(Continued)

FOREIGN PATENT DOCUMENTS

JP        2002-152450 A     5/2002

*Primary Examiner* — Blake Rubin
(74) *Attorney, Agent, or Firm* — Kubotera & Associates LLC

(57) ABSTRACT

An electric mail processing apparatus includes a communication control unit for receiving a mail from the mail server; a main storage unit for storing the mail; a determining unit for determining process contents of the mail; a process performing unit for performing the process contents on the mail; and a mail deletion instructing unit for sending a deletion instruction to the mail server to delete the mail. The determining unit determines whether a first received mail is a subsequently received mail. The communication control unit deletes the subsequently received mail when the determining unit determines that the first received mail is the subsequently received mail. The communication control unit controls the mail deletion instructing unit to send the deletion instruction to the mail server to delete the subsequently received mail.

11 Claims, 8 Drawing Sheets

(56) References Cited

U.S. PATENT DOCUMENTS

| | | | |
|---|---|---|---|
| 2003/0187939 A1* | 10/2003 | O'Brien | 709/206 |
| 2004/0137919 A1* | 7/2004 | Biundo | 455/466 |
| 2004/0246517 A1* | 12/2004 | Parry | 358/1.15 |
| 2005/0010642 A1* | 1/2005 | Parry et al. | 709/206 |
| 2005/0099653 A1* | 5/2005 | Kawaoka | 358/1.15 |
| 2005/0257126 A1* | 11/2005 | Hagiuda et al. | 715/500 |
| 2006/0066889 A1* | 3/2006 | Asano et al. | 358/1.15 |
| 2006/0245019 A1* | 11/2006 | Sawada et al. | 358/540 |
| 2007/0019226 A1* | 1/2007 | Matsuura et al. | 358/1.14 |
| 2007/0236721 A1* | 10/2007 | Okamoto | 358/1.14 |
| 2008/0052633 A1* | 2/2008 | Kubo et al. | 715/752 |
| 2008/0089341 A1* | 4/2008 | Inui | 370/392 |
| 2008/0307059 A1* | 12/2008 | Ono | 709/206 |
| 2009/0067414 A1* | 3/2009 | Toscano et al. | 370/353 |
| 2009/0213426 A1* | 8/2009 | Honda | 358/1.15 |

* cited by examiner

```
From:user1@example.com
To:printer@example.com
Subject:Test Result
Date:Sat. 07 Jul 2007 10:07:07 + 0700
Message-Id:<46AE2EB6.38BU82@example.com>
Mime-Version:1.0
Content-Type:text/plain charset=us-ascii This is your test result.
Result:PASSED
Score:80/100
```
—181

FIG. 7

```
                    1                           —182
From:user1@example.com
To:printer@example.com
Subject:Test Result
Date:Sat. 07 Jul 2007 10:07:07 + 0700
Message-Id:<46AE2EB6.38BU82@example.com>
Mime-Version:1.0
Content-Type:text/plain charset=us-ascii This is your test result.
Result:PASSED
Score:80/100
```
180— , —181

FIG. 8

ELECTRIC MAIL PROCESSING APPARATUS

BACKGROUND OF THE INVENTION AND RELATED ART STATEMENT

The present invention relates to an electric mail processing apparatus for receiving and processing an electric mail such as image data and the like.

A conventional electric mail processing apparatus receives and processes image data as an electric mail sent from a mail server. The conventional electric mail processing apparatus does not send an instruction to the mail server to delete the electric mail until a printing operation is complete (refer to Patent Reference).

Patent Reference: Japanese Patent Publication No. 2002-152450

In the conventional electric mail processing apparatus, when it takes time longer than a specific level to process the electric mail, the conventional electric mail processing apparatus may redundantly performs a same process (such as a printing process of the electric mail or a transmission process of the electric mail to other device).

More specifically, the conventional electric mail processing apparatus may encounter a trouble such as a sheet jam during the printing operation of the electric mail. Further, the conventional electric mail processing apparatus may encounter a communication trouble during the transmission process of the electric mail to other device. When such a trouble occurs while the conventional electric mail processing apparatus processes the electric mail, the conventional electric mail processing apparatus may not be able to complete the process of the electric mail after a specific period of time.

In this case, the conventional electric mail processing apparatus sends an instruction to the mail server, so that the mail server sends the electric mail at a specific interval. In response to the instruction, the mail server sends the same electric mail to the conventional electric mail processing apparatus one more time. Accordingly, the conventional electric mail processing apparatus stores a plurality of electric mails having same contents in a storage unit thereof.

Accordingly, the conventional electric mail processing apparatus sequentially processes the electric mails having same contents and stored in the storage unit thereof. As a result, the conventional electric mail processing apparatus redundantly performs the same process (such as the printing process of the electric mail or the transmission process of the electric mail to other device). Therefore, the conventional electric mail processing apparatus consumes an extra amount of supplies such as sheets and the like, and performance of a control unit is temporarily lowered due to the redundant process.

In view of the problems described above, an object of the present invention is to provide an electric mail processing apparatus capable of solving the problems of the conventional electric mail processing apparatus. In the electric mail processing apparatus, even when it takes a long time to process an electric mail, it is possible to prevent a same process from being redundantly performed.

Further objects and advantages of the invention will be apparent from the following description of the invention.

SUMMARY OF THE INVENTION

In order to attain the objects described above, according to the present invention, an electric mail processing apparatus includes a communication control unit for sending a transmission request at a specific interval to a mail server to send an electric mail and receiving the electric mail sent from the mail server as a response to the transmission request as a received mail; a main storage unit for storing the received mail received with the communication control unit; a determining unit for determining specific information and process contents of the received mail; a process performing unit for performing a process of the process contents determined with the determining unit on the received mail; and a mail deletion instructing unit for sending a deletion instruction to the mail server to delete the electric mail corresponding to the received mail processed with the process performing unit.

Further, in the electric mail processing apparatus, when the communication control unit receives another electric mail from the mail server while the received mail is stored in the mail storage unit, the communication control unit is arranged to define the received mail stored in the mail storage unit as a first received mail and the another electric mail as a subsequently received mail. The determining unit is arranged to determine whether the first received mail is an equivalent to the subsequently received mail. When the determining unit determines that the first received mail is the equivalent to the subsequently received mail, the communication control unit is arranged to delete the subsequently received mail stored in the mail storage unit. Further, the communication control unit controls the mail deletion instructing unit to send the deletion instruction to the mail server to delete the another electric mail corresponding to the subsequently received mail.

In the electric mail processing apparatus of the present invention, even when it takes a long time to process an electric mail, it is possible to prevent a same process from being redundantly performed.

BRIEF DESCRIPTION OF THE DRAWINGS

FIG. 7 is a schematic view showing an example No. 1 of an electric mail sent to the electric mail processing apparatus according to the first embodiment of the present invention;

FIG. 8 is a schematic view showing an example No. 2 of an electric mail sent to the electric mail processing apparatus according to the first embodiment of the present invention;

DETAILED DESCRIPTION OF THE PREFERRED EMBODIMENTS

Figure 1:
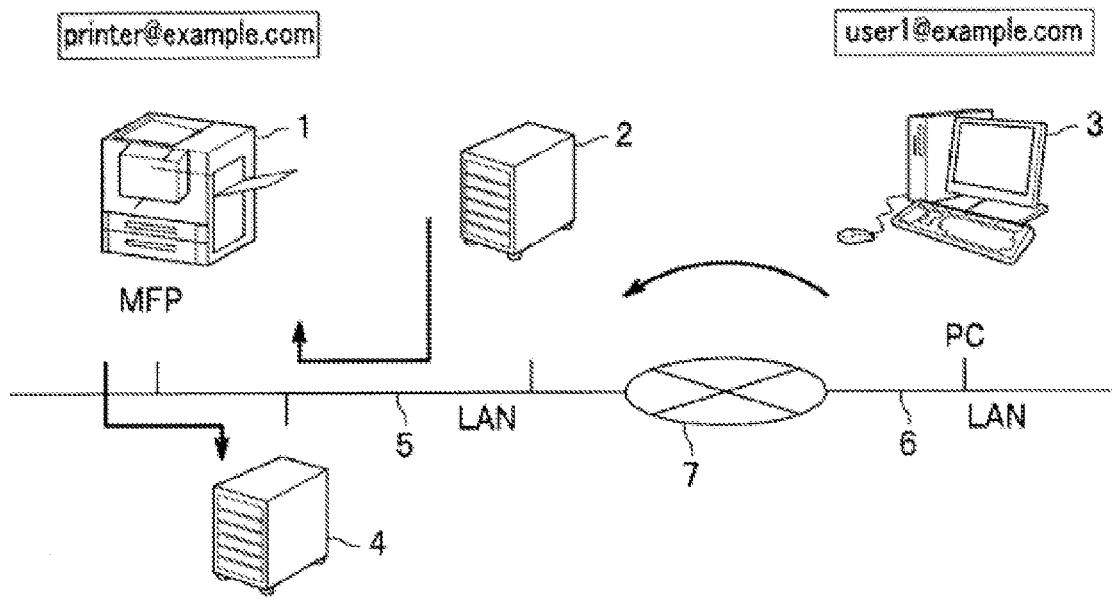
FIG. 1 is a schematic view showing a network of an electric mail processing apparatus and other devices according to a first embodiment of the present invention.

Hereunder, embodiments of the present invention will be explained with reference to the accompanying drawings. Note that the accompanying drawings schematically represent shapes, sizes, and geometric relations of components only for explaining the present invention, and the present invention is not limited to the accompanying drawings. Similar components in the accompanying drawings are designated with the same reference numerals, and redundant explanations are omitted.

First Embodiment

Figure 2:
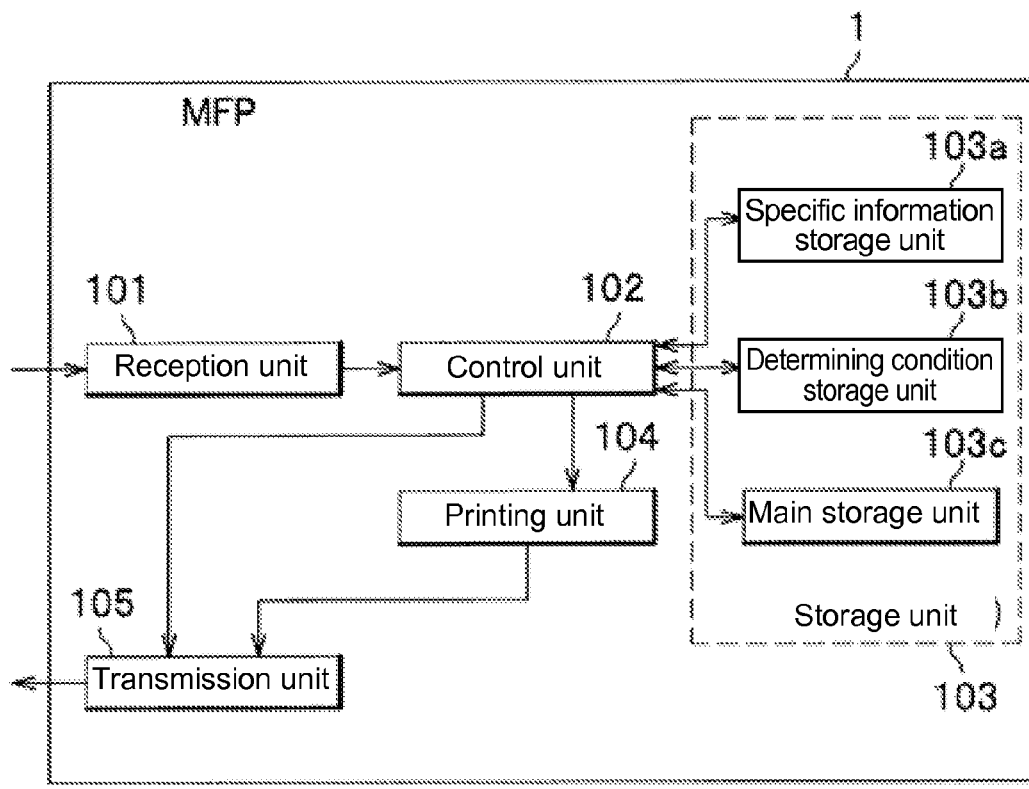
FIG. 2 is a block diagram showing the electric mail processing apparatus according to the first embodiment of the present invention.
Figure 3:
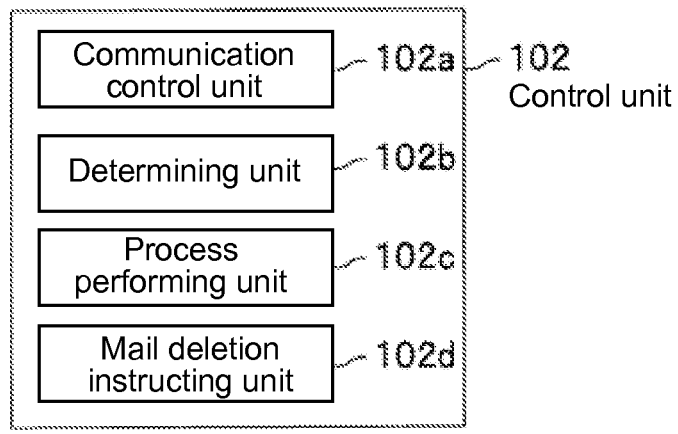
FIG. 3 is a block diagram showing a control unit of the electric mail processing apparatus according to the first embodiment of the present invention.

A first embodiment of the present invention will be explained. First, a configuration of an electric mail processing apparatus will be explained with reference to FIGS. 1 to 3. FIG. 1 is a schematic view showing a network of the electric mail processing apparatus and other devices according to the first embodiment of the present invention. FIG. 2 is a block diagram showing the electric mail processing apparatus according to the first embodiment of the present invention. FIG. 3 is a block diagram showing a control unit of the electric mail processing apparatus according to the first embodiment of the present invention.

In the following description, a multi function printer (referred to as an MFP 1) will be explained as the electric mail processing apparatus according to the first embodiment of the present invention. The MFP 1 is an apparatus having a facsimile function, a scanner function, and a copier function, in addition to a printer function. The MFP 1 also has a function of receiving an electric mail (referred to as a mail) from a mail server 2.

In the embodiment, when the MFP 1 receives a mail from the mail server 2, the MFP 1 performs a specific process (for example, a printing process, a transmission process to other device such as a file server 4, and the like) on the mail in response. Note that process contents of the specific process are determined in advance according to a destination of the mail. A determining condition for determining the process contents is stored in advance in, for example, a determining condition storage unit 103b (described later, refer to FIG. 2).

First, a connection relationship between the MFP 1 and other devices will be explained with reference to FIG. 1. As shown in FIG. 1, an LAN 5 and an LAN 6 are connected through an internet 7. The MFP 1 as the electric mail process apparatus, the mail server 2, and the file server 4 are connected to the LAN 5. A personal computer 3 (referred to as a PC 3) is connected to the LAN 6. In communication between two devices, first a device on a reception side temporarily stores data received in a storage unit thereof, and then the data are retrieved from the storage unit. The process is well known in the field of communication technology, and detailed explanations are omitted.

In the embodiment, the MFP 1 and the PC 3 have specific mail addresses, respectively. More specifically, the MFP 1 has a mail address "printer@example.com", and the PC 3 has a mail address "user1@example.com". The MFP1 and the PC 3 are configured to send and receive the mail therebetween through the mail server 2.

In the embodiment, the PC 3 sends the mail to the mail address "printer@example.com" through the mail server 2, and the MFP 1 receives the mail from the PC 3 through the mail server 2. When the MFP 1 receives the mail, the MFP 1 determines an address of an originator of the mail (in this case, the mail address "user1@example.com" of the PC 3), and determines the process contents of the mail.

As described above, the process contents are stored in advance according to an originator of the mail. Accordingly, when the MFP 1 determines an address of the originator of the mail, the MFP 1 can determine the process contents of the mail (that is, determines what type of process is to be performed on the mail). When the MFP 1 determines the process contents of the mail, the MFP 1 performs the process of the process contents thus determined on the mail. If the MFP 1 receives the mail from an originator without process contents, the MFP 1 performs a process defined in advance as a routine process (for example, a printing process).

A configuration of the MFP 1 will be explained with reference to FIG. 2. As shown in FIG. 2, the MFP 1 includes a reception unit 101, a control unit 102, a storage unit 103, a printing unit 104, and a transmission unit 105. The units are connected through a bus (not shown), respectively.

In the embodiment, the reception unit 101 is an interface for receiving various data including the mail from other devices (such as the mail server 2, the PC 3, the file server 4, and the like). The reception unit 101 is connected to the LAN 5 (refer to FIG. 1), so that the reception unit 101 receives the mail from, for example, the mail server 2 through the LAN 5. More specifically, the reception unit 101 uses a communication protocol such as POP3 (Post Office Protocol Version 3) and IMAP (Internet Message Access Protocol) for receiving the mail.

Further, the reception unit 101 is connected to the control unit 102 through a bus (not shown). When the reception unit 101 receives the mail from the mail server 2, the reception unit 101 sends the mail thus received and specific information 110 (refer to FIG. 4) of the mail obtained through the communication with the mail server 2 to the control unit 102.

In the embodiment, the control unit 102 has a function of controlling an operation of the MFP 1. The control unit 102 is formed of a CPU (Central Processing Unit). A detailed configuration of the control unit 102 will be explained later with reference to FIG. 3.

In the embodiment, the storage unit 103 has a function of storing various programs and data. The storage unit 103 is formed of an RAM (Random Access Memory), preferably an NVRAM (Non-Volatile RAM). The NVRAM includes a battery disposed inside or outside an SRAM for supplying power to the SRAM, so that the SRAM stores data even when main power is not supplied to the SRAM.

In the embodiment, the storage unit 103 includes a specific information storage unit 103a, the determining condition storage unit 103b, and a main storage unit 103c. A part of the storage unit 103 (for example, the specific information storage unit 103a) may be formed of an ROM (Read Only Memory).

In the embodiment, the specific information storage unit 103a is a storage unit for storing the specific information 110 (refer to FIG. 4) of the mail. More specifically, the specific information storage unit 103a retrieves the specific information 110 sent from the control unit 102, and stores the specific information 110 therein. After the specific information 110 is stored in the specific information storage unit 103a, the specific information 110 is output to the transmission unit 105, so that the specific information 110 is used for the transmission process to other devices.

Figure 4:
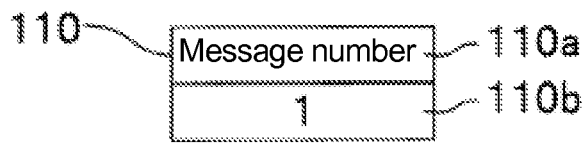
FIG. 4 is a schematic view showing an example of specific information of an electric mail according to the first embodiment of the present invention.

FIG. 4 is a schematic view showing an example of the specific information 110 of the mail according to the first embodiment of the present invention. As shown in FIG. 4, the specific information 110 includes information representing a specific number assigned to a mail main text of each mail (a message number 110*a*) and a value 110*b* assigned to the message number 110*a*. In the example shown in FIG. 4, the value 110*b* of "1" is assigned to the message number 110*a*.

Figure 11:
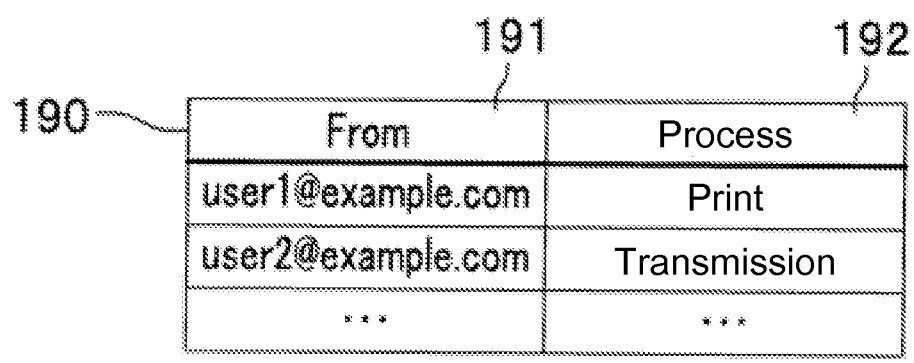
FIG. 11 is a schematic view showing a table showing determining condition information according to the first embodiment of the present invention.

In the embodiment, the determining condition storage unit 103*b* is a storage unit for storing in advance information defining conditions for determining the process contents of the mail (referred to as determining condition information 190, refer to FIG. 11).

FIG. 11 is a schematic view showing a table showing the determining condition information 190 according to the first embodiment of the present invention. A determining unit 102*b* of the control unit 102 (refer to FIG. 3) determines the process contents of the mail according to the determining condition information 190 stored in the determining condition storage unit 103*b* in advance.

As shown in FIG. 11, the determining condition information 190 includes information representing the originator of the mail (From information 191) and information representing the process contents of the mail (process contents information 192). In this case, the determining unit 102*b* determines the printing process as the process contents with regard to the mail with the From information 191 of "user1@example.com". Further, the determining unit 102*b* determines the transmission process to the file server 4 as the process contents with regard to the mail with the From information 191 of "user2@example.com".

In the embodiment, the main storage unit 103*c* is a storage unit for storing the mail received from the mail server 2 to be freely readable. The mail stored in the main storage unit 103*c* is output to the printing unit 104, so that the printing process is performed thereon, or is output to the transmission unit 105, so that the mail is forwarded to other devices.

In the embodiment, the printing unit 104 has a function of printing the mail. After the printing unit 104 completes the printing process of the mail, the printing unit 104 sends a notice of the completion of the printing process to the control unit 102. Then, the control unit 102 sends the notice of the completion of the printing process to the mail server 2 through the transmission unit 105.

In the embodiment, the transmission unit 105 is an interface for transmitting various data including the mail to other devices (such as the mail server 2, the PC 3, and the file server 4). The transmission unit 5 is connected to the LAN 5, so that the transmission unit 105 sends, for example, a deletion instruction of the mail to the mail server 2.

A configuration of the control unit 102 of the MFP 1 will be explained next with reference to FIG. 3. As shown in FIG. 3, the control unit 102 includes a communication control unit 102*a*, the determining unit 102*b*, a process performing unit 102*c*, and a mail deletion instructing unit 102*d*. The control unit 102 executes a program stored in an ROM (not shown) to control the communication control unit 102*a*, the determining unit 102*b*, the process performing unit 102*c*, and the mail deletion instructing unit 102*d*.

In the embodiment, the communication control unit 102*a* has a function of controlling communication with other devices. More specifically, the communication control unit 102*a* requests the mail server 2 (refer to FIG. 1) to send the mail at a specific interval, and receives the mail sent from the mail server 2 in response to the transmission request. In the following description, the mail received from the mail server 2 may be referred to as a received mail.

When the communication control unit 102*a* receives the mail from the mail server 2, the communication control unit 102*a* stores the specific information 110 (refer to FIG. 4) of the received mail thus received (the received mail) in the specific information storage unit 103*a*, and stores the received mail in the main storage unit 103*c*. After the control unit 102 performs a specific process on the received mail, the received mail stored in the main storage unit 103*c* is deleted.

In the embodiment, the determining unit 102*b* has a function of determining the specific information 110 (refer to FIG. 4) of the received mail received with the communication control unit 102*a* and the process contents thereof. As described above, the process contents are defined in advance according to the originator of the mail. More specifically, the determining unit 102*b* determines the address of the originator of the mail, thereby determining the process contents of the mail.

An operation of the determining unit 102*b* will be explained in more detail. When the reception unit 101 receives the mail from the mail server 2, the determining unit 102*b* determines whether the received mail is to be processed. More specifically, the determining unit 102*b* uses the specific information 110 of the received mail and the specific information stored in the specific information storage unit 103*a* (described later) to determine whether the received mail is to be processed.

When the determining unit 102*b* determines that the received mail is to be processed, the determining unit 102*b* determines the process contents of the received mail. As described above, the process contents are stored in advance in the determining condition storage unit 103*b*. Accordingly, the determining unit 102*b* determines whether the received mail is to be printed, or the received mail is to be forwarded to the file server 4 according to the process contents.

In the embodiment, the process performing unit 102*c* has a function of performing the process of the process contents determined with the determining unit 102*b* on the received mail stored in the main storage unit 103*c*. More specifically, when the process performing unit 102*c* performs the process on the received mail stored in the main storage unit 103*c*, the process performing unit 102*c* deletes the specific information 110 of the received mail thus processed, and deletes the received mail thus processed stored in the main storage unit 103*c*.

An operation of the process performing unit 102*c* will be explained in more detail. As described above, the process performing unit 102*c* performs the process of the process contents determined with the determining unit 102*b* on the received mail. When the process performing unit 102*c* performs the printing process of the mail, the process performing unit 102*c* retrieves the mail from the main storage unit 103*c*, and outputs the mail to the printing unit 104. When the process performing unit 102*c* performs the transmission process to other device (such as the file server 4, refer to FIG. 1), the process performing unit 102*c* retrieves the mail from the main storage unit 103*c*, and converts the mail into a data format used in a transmission destination, thereby transmitting the mail through the transmission unit 105. Further, the process performing unit 102*c* stores the specific information 110 of the mail in the specific information storage unit 103*a*.

In the embodiment, the mail deletion instructing unit 102*d* has a function of sending a deletion instruction to the mail server 2 to delete the received mail processed with the process performing unit 102c (referred to as a processed received mail).

An operation of the mail deletion instructing unit 102d will be explained in more detail. When the specific process (such as the printing process and the forward process to other devices) is performed on the received mail, the process performing unit 102c detects the completion of the specific process, and sends a process completion notice to the mail deletion instructing unit 102d. When the mail deletion instructing unit 102d receives the process completion notice, the mail deletion instructing unit 102d retrieves the specific information 110 of the mail (refer to FIG. 4) stored in the specific information storage unit 103a, and generates the deletion instruction of the mail thus processed according to the specific information 110 thus retrieved.

Afterward, the mail deletion instructing unit 102d sends the deletion instruction of the mail thus generated to the mail server 2 through the transmission unit 105, thereby transmitting the deletion instruction. In this step, the mail deletion instructing unit 102d deletes the specific information 110 of the mail to be deleted from the specific information storage unit 103a.

In the embodiment, a control program stored in an ROM (not shown) to be freely readable controls an entire operation of the control unit 102. Further, the control unit 102 operates according to time measured with a timer (not shown). Various types of information are temporarily stored in the storage unit 103 to be freely readable, and then are output to the units for performing a subsequent process. The sequence is well known in the information processing technology, and a detailed explanation thereof is omitted.

In the embodiment, the MFP 1 has the configuration described above. The MFP 1 is connected to the LAN 5, and may be connected to a network other than the LAN 5, so that the MFP 1 receives and sends the mail through the network.

Figure 5:
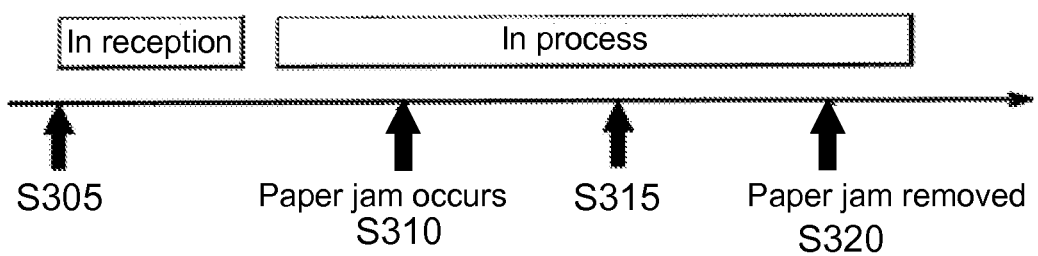
FIG. 5 is a schematic view showing an operation of the electric mail processing apparatus according to the first embodiment of the present invention.
Figure 6:
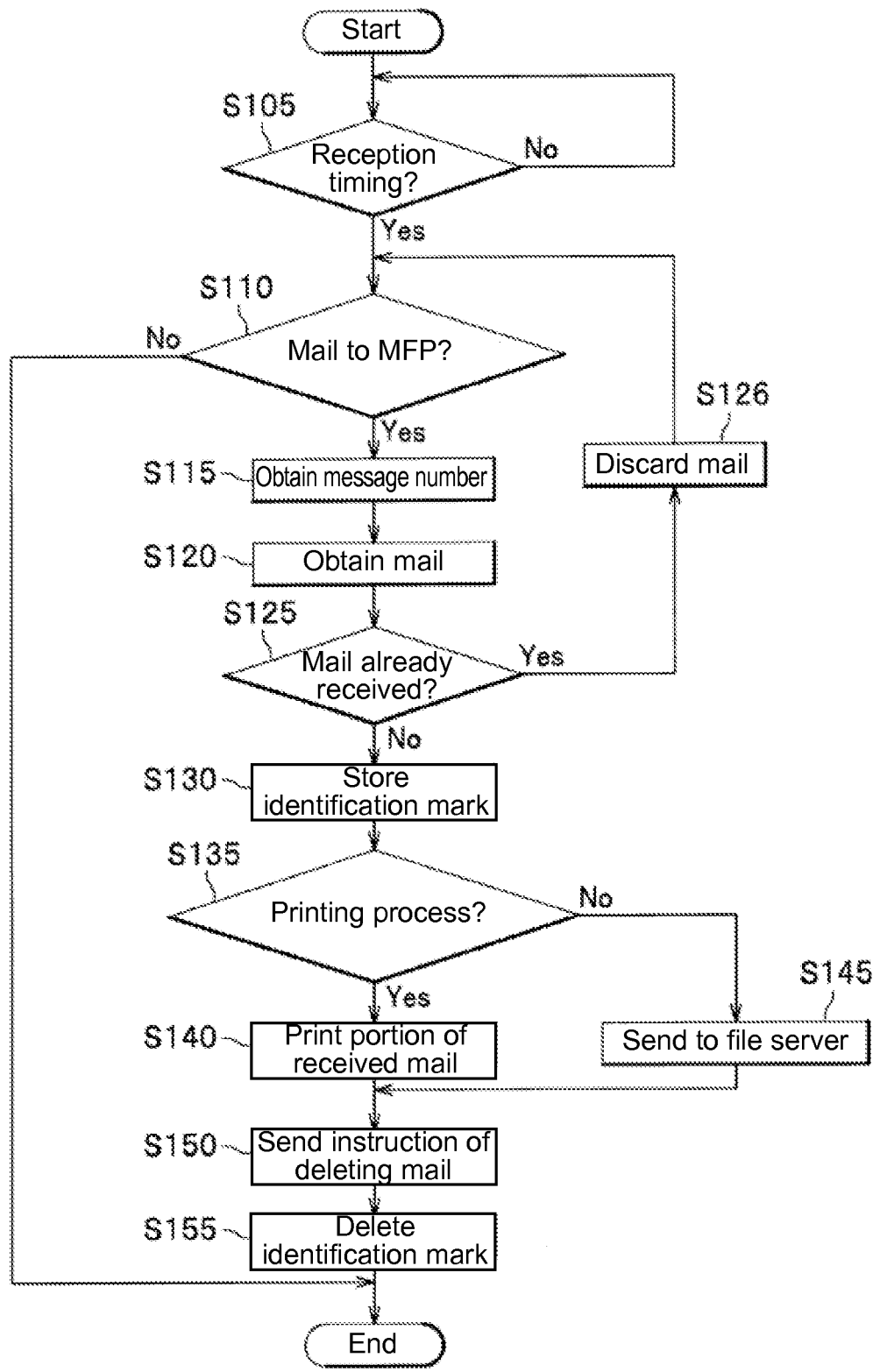
FIG. 6 is a flow chart showing the operation of the electric mail processing apparatus according to the first embodiment of the present invention.

An operation of the MFP 1 will be explained next with reference to FIGS. 5 and 6. FIG. 5 is a schematic view showing the operation of the electric mail processing apparatus according to the first embodiment of the present invention. FIG. 6 is a flow chart showing the operation of the electric mail processing apparatus according to the first embodiment of the present invention. FIG. 6 shows the operation of the MFP 1 when the MFP 1 receives a mail from the mail server 2.

First, a situation of taking a time longer than a specific level to process the mail will be explained with reference to FIG. 5. FIG. 5 is the schematic view showing the operation of the MFP 1 in a case of taking a time longer than a specific level to process the mail.

As shown in FIG. 5, in step S310, a paper jam occurs in the MFP 1 while the MFP 1 is processing the mail. In this case, the MFP 1 becomes a state of "in process" until the paper jam is removed, so that the process is not completed.

In step S315, while the paper jam is not removed and the MFP 1 is in the state of "in process", the MFP 1 receives another mail from the mail server 2. At this moment, when the mail server 2 has one or more mails to be sent to the MFP 1 (one or more mails to be sent to the MFP 1 are stored in a storage unit of the mail server 2), the mail server 2 sends the one or more mails to the MFP 1. Accordingly, the MFP 1 receives the one or more mails from the mail server 2.

In the following description, another mail received by the MFP 1 from the mail server 2 is referred to as a subsequently received mail. Note that the subsequently received mail may be a received mail already processed or to be processed with the MFP 1. Further, the mail received by the MFP 1 from the mail server 2 before the MFP 1 receives the subsequently received mail is referred to as a first received mail. When the MFP 1 receives a plurality of subsequently received mails from the mail server 2, the MFP 1 stores the subsequently received mails in the main storage unit 103c (refer to FIG. 3). Accordingly, as far as the paper jam is not removed, the MFP 1 sequentially receives the subsequently received mails from the mail server 2, and stores the subsequently received mails in the main storage unit 103c.

In step S320, when the paper jam is removed, the MFP 1 resumes and completes the process on the mail in the state of "in process", and performs the process on the subsequently received mails. After the MFP 1 completes the process on all of the subsequently received mails stored in the main storage unit 103c, the operation is complete.

An operation of the control unit 102 of the MFP 1 will be explained in more detail with reference to FIG. 6. FIG. 6 shows an entire operation of the control unit 102.

In step S105, the control unit 102 of the MFP 1 starts operating every time when a specific period of time is elapsed. At this moment, the communication control unit 102a of the control unit 102 determines whether it is reception timing. When the communication control unit 102a of the control unit 102 determines that it is not the reception timing (in the case of "No"), the operation returns to step S105. In this case, the communication control unit 102a repeats step S105 until it becomes the reception timing.

In step S110, when the communication control unit 102a of the control unit 102 determines that it is the reception timing (in the case of "Yes"), the communication control unit 102a determines whether a mail 181 (refer to FIG. 7) to be sent to the MFP 1 is stored in the mail server 2 (that is, whether the mail is stored in the storage unit of the mail server 2).

FIG. 7 is a schematic view showing an example No. 1 of the electric mail 181 to be sent to the electric mail processing apparatus according to the first embodiment of the present invention. FIG. 7 shows the example No. 1 of the electric mail 181 received by the mail server 2 from the PC 3 and to be sent to the MFP 1.

As shown in FIG. 7, a mail address of an originator of the mail 181 is shown in a first line of the mail 181 to be sent to the MFP 1. More specifically, the mail address "user1@example.com" of the MFP 1 is shown as the mail address of the originator of the mail 181. Further, a mail address of a destination of the mail 181 is shown in a second line of the mail 181. More specifically, a mail address "printer@example.com" is shown as the mail address of the destination of the mail 181.

Further, a subject is shown in a third line of the reception unit 101. A time when the mail 181 is sent is shown in a fourth line of the mail 181. An identification mark specific to a mail message is shown in a fifth line of the mail 181. A mail format is shown in a sixth line of the mail 181. More specifically, MIME (Multipurpose Internet Mail Extension) version 1.0 is shown as the mail format. A type of the mail 181 is shown in a seventh line of the mail 181. More specifically, a text written in "us-ascii" is shown as the type of the mail 181. An eight line of the mail 181 is blank indicating a boundary between a header of the mail 181 and a main text. The main text is shown in a ninth line and below of the mail 181.

In step S110, the communication control unit 102a determines whether the mail 181 to be sent to the MFP 1 is stored in the mail server 2 as follows. First, the communication control unit 102a generates an existence confirmation request of the mail to be sent to the MFP 1 (that is, an instruction to execute a confirmation process of the mail to be sent to the MFP 1). Then, the communication control unit 102a sends the existence confirmation request to the mail server 2 through the transmission unit 105. When the mail server 2 receives the existence confirmation request, the mail server 2 confirms the mail 181 to be sent to the MFP 1 from a group of mails stored in the storage unit thereof (not shown), and sends a confirmation result to the MFP 1. Accordingly, the communication control unit 102*a* of the MFP 1 receives the confirmation result from the mail server 2 through the reception unit 101. When the communication control unit 102*a* receives the confirmation result, the communication control unit 102*a* determines in response whether the mail 181 to be sent to the MFP 1 exists in the mail server 2 according to the confirmation result of the mail 181 thus received.

When the communication control unit 102*a* determines that the mail 181 to be sent to the MFP 1 is not stored in the mail server 2 in step S110 (in the case of "No"), the operation is complete. When the communication control unit 102*a* determines that the mail 181 to be sent to the MFP 1 is stored in the mail server 2 in step S110 (in the case of "Yes"), the communication control unit 102*a* sends the transmission request to the mail server 2 to send the mail 181 to be sent to the MFP 1. When the mail server 2 receives the transmission request, in response, the mail server 2 assigns a message number 182 (refer to FIG. 8) to the mail 181 to be sent to the MFP 1, and sends the message number 182 to the MFP 1. Afterward, the mail server 2 sends the mail 181 (refer to FIG. 8) to be sent to the MFP 1 to the MFP 1. An operation of transmitting the message number 182 will be explained in more detail later using a concrete example of the communication when the MFP 1 receives the mail 181 with reference to FIG. 9.

In step S115, the communication control unit 102*a* obtains the message number 182 from the mail server 2 through the reception unit 101. In step S120, the communication control unit 102*a* obtains the mail 181 to be sent to the MFP 1 corresponding to the message number 182.

When the communication control unit 102*a* receives the message number 182 and the mail 181 to be sent to the MFP 1 from the mail server 2 in steps S115 and S120, in response, the communication control unit 102*a* stores the message number 182 in the specific information storage unit 103*a*. Further, the communication control unit 102*a* generates data 180 (refer to FIG. 8) combined the message number 182 with the mail 181 to be sent to the MFP 1, and stores the data 180 in the main storage unit 103*c*. The data 180 thus generated is referred to as a received mail 180.

FIG. 8 is a schematic view showing an example No. 2 of the received mail 180 sent to the electric mail processing apparatus according to the first embodiment of the present invention. In the example, "1" is assigned in the received mail 180 as a value of the message number 182, and an entire message is shown as the mail 181 to be sent to the MFP 1 as shown in FIG. 8.

In step S125, the determining unit 102*b* of the control unit 102 determines whether the received mail 180 is the mail already received (that is, whether the same mail is already stored in the main storage unit 103*c*). More specifically, the determining unit 102*b* determines whether the value matching to the message number 182 (refer to FIG. 8) in the received mail 180 exists among value 110*b* of the message number 110*a* of the specific information 110 (refer to FIG. 4) stored in the specific information storage unit 103*a*.

When the determining unit 102*b* determines that the value matching to the message number 182 (refer to FIG. 8) in the received mail 180 exists among the value 110*b* of the message number 110*a* of the specific information 110 (refer to FIG. 4) stored in the specific information storage unit 103*a* in step S125, the determining unit 102*b* determines that the received mail 180 is the mail already stored (in the case of "Yes"). In this case, the received mail 180 becomes the subsequently received mail received as an equivalent to the mail already received. More specifically, the received mail 180 stored already in the main storage unit 103*c* is the first received mail, and the received mail 180 received afterward is the subsequently received mail.

In step S126, the determining unit 102*b* discards the subsequently received mail, and the operation returns to step S110, so that the control unit 102 repeats steps S110 to S126. More specifically, the communication control unit 102*a* of the control unit 102 repeatedly sends the existence confirmation request of the mail to be sent to the MFP 1 to obtain another mail.

When the determining unit 102*b* determines that the value matching to the message number 182 (refer to FIG. 8) in the received mail 180 does not exist among the value 110*b* of the message number 110*a* of the specific information 110 (refer to FIG. 4) stored in the specific information storage unit 103*a* in step S125, the determining unit 102*b* determines that the received mail 180 is not the mail already stored (in the case of "No"). In this case, the received mail 180 becomes a non-received mail not received before the received mail 180 is received. In step S130, the determining unit 102*b* stores the value of the message number 182 of the received mail 180 (referred to as an identification mark) to perform the process on the received mail 180.

After step S130, in step S135, the determining unit 102*b* determines whether the process contents with respect to the received mail 180 are the printing process (that is, what type of process is performed on the received mail 180) according to the determining condition information 190 (refer to FIG. 11) stored in advance in the determining condition storage unit 103*b*.

For example, as shown in FIG. 11, the printing process is defined as the process contents of the received mail 180, in which "user1@example.com" is listed as the From information 191. Accordingly, the determining unit 102*b* determines that the process contents with respect to the received mail 180 are the printing process. When the address corresponding to the transmission process (such as "user2@example.com") is listed as the From information 191, the determining unit 102*b* determines that the process contents with respect to the received mail 180 are the transmission process.

When the determining unit 102*b* determines that the process contents with respect to the received mail 180 are the printing process in step S135 (in the case of "Yes"), the process performing unit 102*c* of the control unit 102 outputs the received mail 180 to the printing unit 104. Accordingly, in step S140, the printing unit 104 prints a portion of the received mail 180 to be printed (the mail main text below the ninth line shown in FIG. 8).

When the determining unit 102*b* determines that the process contents with respect to the received mail 180 are the transmission process in step S135 (in the case of "No"), the process performing unit 102*c* of the control unit 102 converts the mail main text of the received mail 180 to a storage format of the file server 4. The mail main text corresponds to the mail 181 to be sent to the MFP 1 (refer to FIG. 8). In the following description, the mail main text is also referred to as the mail main text 181. In step S145, the process performing unit 102*c* sends the message number 182 of the received mail 180 and the mail main text 181 thus converted to the file server 4 through the transmission unit 105.

After steps S140 and S145, when the process performing unit 102*c* detects completion of the process (that is, completion of the printing process with the printing unit 104 or the transmission process of the message number 182 and the mail 181 with the converted format with the transmission unit 105), the process performing unit 102c sends a completion notice of the process in response to the mail deletion instructing unit 102d. When the mail deletion instructing unit 102d receives the completion notice of the process from the process performing unit 102c, in response, the mail deletion instructing unit 102d specifies the message number 182 of the received mail 180 with the process thus completed.

In step S150, the mail deletion instructing unit 102d sends an instruction of deleting the mail corresponding to the message number 182 (referred to as a mail deletion instruction) to the mail server 2. When the mail server 2 receives the mail deletion instruction, in response, the mail server 2 deletes the mail corresponding to the message number 182 thus specified among the mails stored in the storage unit thereof (not shown).

In step S155, after step S150, the mail deletion instructing unit 102d deletes the value of the message number 182 of the received mail 180 with the process thus completed (the identification mark) from the specific information storage unit 103a, thereby completing the operation.

Figure 9:
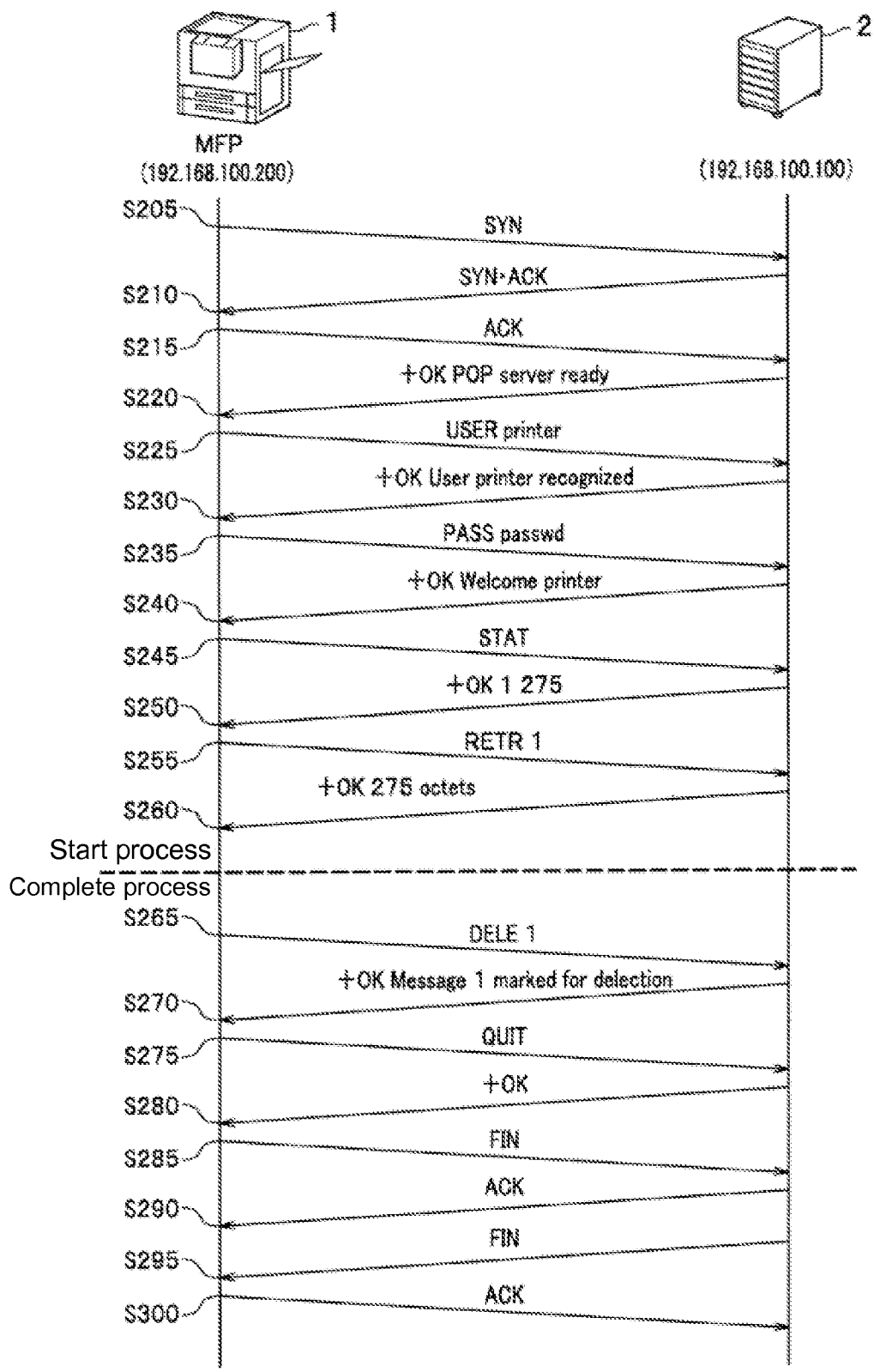
FIG. 9 is a schematic view showing an example No. 1 of communication of the electric mail processing apparatus when the electric mail processing apparatus receives an electric mail according to the first embodiment of the present invention.
Figure 10:
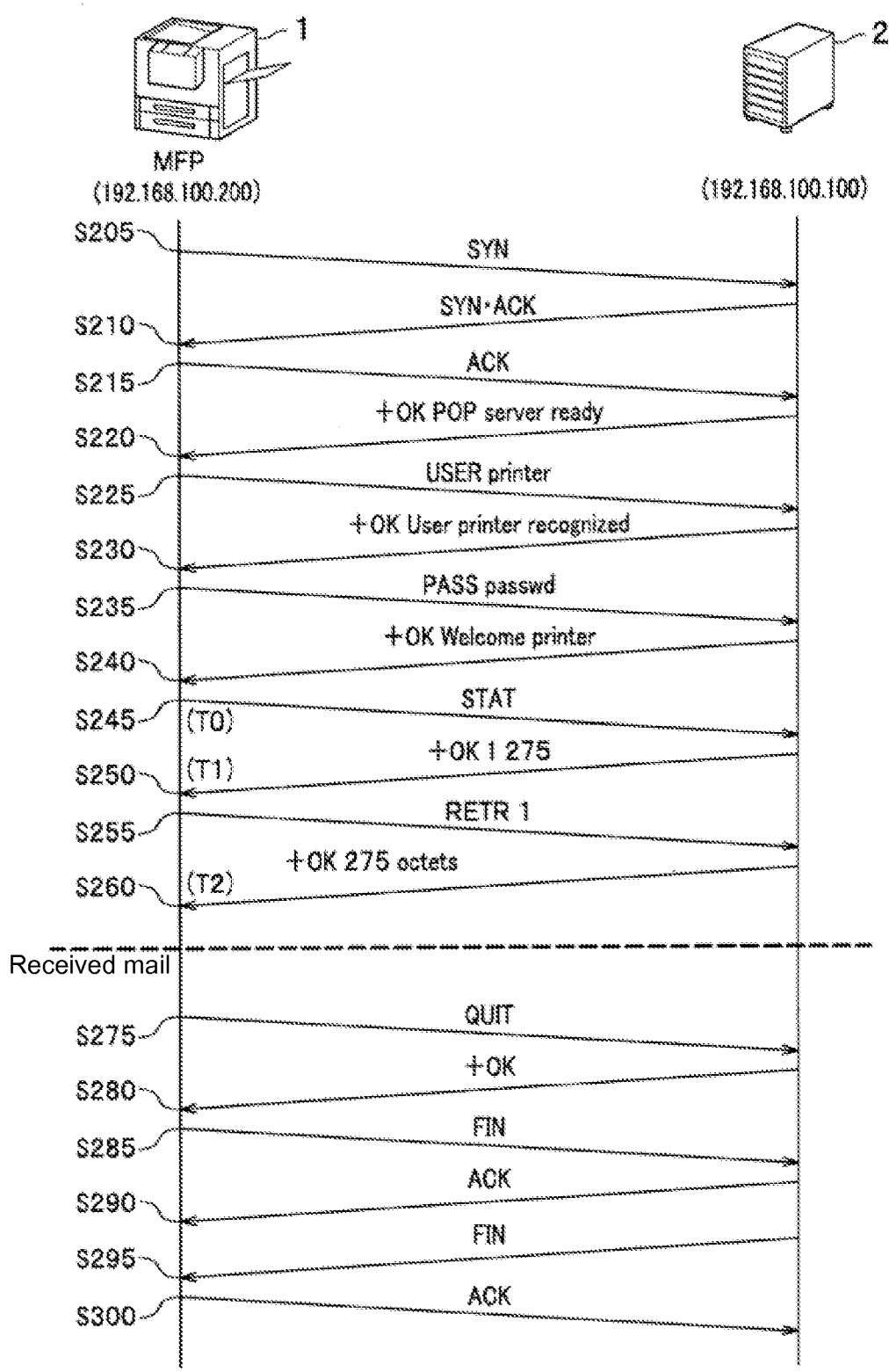
FIG. 10 is a schematic view showing an example No. 2 of communication of the electric mail processing apparatus when the electric mail processing apparatus receives an electric mail according to the first embodiment of the present invention.

A concrete example of communication of the MFP 1 when the MFP 1 receives the mail will be explained next with reference to FIGS. 9 and 10. FIG. 9 is a schematic view showing an example No. 1 of the communication of the electric mail processing apparatus when the electric mail processing apparatus receives the electric mail according to the first embodiment of the present invention. FIG. 10 is a schematic view showing an example No. 2 of the communication of the electric mail processing apparatus when the electric mail processing apparatus receives the electric mail according to the first embodiment of the present invention.

FIG. 9 shows an operation of the MFP 1 when the received mail 180 is an equivalent to the non-received mail, and FIG. 10 shows an operation of the MFP 1 when the received mail 180 is the first received mail. In the operations shown in FIGS. 9 and 10, the MFP 1 uses POP3 as the communication protocol for receiving the mail from the mail server 2.

As shown in FIG. 9, when the received mail 180 is the non-received mail, the MFP 1 receives the mail from the mail server 2; performs the printing process on the mail thus received; and deletes the mail from the mail server 2 after the printing process is performed on the mail as follows.

First, the MFP 1 (more specifically, the communication control unit 102a of the control unit 102) establishes TCP (Transmission Control Protocol) connection with respect to the mail server 2. In establishing the TCP connection, first, in step S205, the MFP 1 sends an SYN command to the mail server 2. In step S210, when the mail server 2 receives the SYN command from the MFP 1, the mail server 2 sends an SYN•ACK command to the MFP 1 in response. In step S215, when the communication control unit 102a receives the SYN•ACK command from the mail server 2, the communication control unit 102a sends an ACK command to the mail server 2 in response. In step S220, when the mail server 2 receives the ACK command from the MFP 1, the mail server 2 sends a response such as "+OK POP server ready" to the MFP 1. Accordingly, the TCP connection is established between the MFP 1 and the mail server 2.

In step S225, after the TCP connection is established, in response, the communication control unit 102a of the MFP 1 sends to the mail server 2 a command such as "USER printer" indicating a user name such as "printer" necessary for connecting to the mail server 2. In step S230, when the mail server 2 receives the command indicating the user name, the mail server 2 recognizes the command indicating the user name in response, and sends a response such as "+OK USER printer recognized" to the MFP 1.

In step S235, in response, the communication control unit 102a of the MFP 1 sends to the mail server 2 a command such as "PASS passwd" indicating a password such as "passwd" necessary for connecting to the mail server 2. In step S240, when the mail server 2 receives the command indicating the password, the mail server 2 recognizes the command indicating the password in response, and sends a response such as "+OK Welcome printer" indicating a recognition result to the MFP 1. Accordingly, the MFP 1 is ready to receive the mail 181 to be sent to the MFP 1 from the mail server 2.

In the next step, the communication control unit 102a of the MFP 1 confirms that the mail 181 to be sent to the MFP 1 is stored in the mail server 2. The process corresponds to the process in step S110 shown in FIG. 6. More specifically, in step S245, the communication control unit 102a sends to the mail server 2 a command such as "STAT" indicating the existence confirmation request of the mail 181 to be sent to the MFP 1. In step S250, when the mail server 2 receives from the MFP 1 the command indicating the existence confirmation request of the mail 181 to be sent to the MFP 1, the mail server 2 confirms the mail 181 to be sent to the MFP 1 from a group of the mails stored in the storage unit thereof (not shown), and sends a response such as "+OK 1 275" indicating the confirmation result to the MFP 1. The response represents that the mail server 2 stores (receives) the mail having the message number 182 of "1" and a size of 275 bytes.

When the communication control unit 102a of the MFP 1 confirms that the mail 181 to be sent to the MFP 1 is stored in the mail server 2, the communication control unit 102a receives the message number 182 of the mail 181 from the mail server 2 through the reception unit 101. The process corresponds to the process in step S115 shown in FIG. 6. More specifically, in step S255, the communication control unit 102a sends to the mail server 2 in response a command such as "RETR 1" indicating the transmission request to send the mail 181 to be sent to the MFP 1, so that the communication control unit 102a receives the mail 181 with the message number 182 of "1".

In step S260, when the mail server 2 receives from the MFP 1 the transmission request of the mail 181 to be sent to the MFP 1, in response, the mail server 2 sends a response such as "+OK 275 octets" to the MFP 1, and then sends the mail 181 to be sent to the MFP 1 to the MFP 1. Accordingly, the communication control unit 102a receives the mail 181 from the mail server 2 through the reception unit 101. The process corresponds to the process in step S120 shown in FIG. 6. In the description, it is supposed that the main storage unit 103c stores one or more of the received mails 180.

As described above, the received mail 180 stored already in the main storage unit 103c is defined as the first received mail, and the received mail 180 received afterward is defined as the subsequently received mail. Accordingly, in the following description, it is possible to distinguish the received mail 180 stored already in the main storage unit 103c from the mail 181 with the message number 182 received in steps S250 and S260.

In the next step, when the MFP 1 (more specifically, the determining unit 102b of the control unit 102) receives the message number 182 and the mail 181 in steps S250 and S260, in response, the determining unit 102b determines whether the value matching to the message number 182 (refer to FIG. 8) in the subsequently received mail exists among the value 110b of the message number 110a of the specific information 110 (refer to FIG. 4) stored in the specific information storage unit 103a. Accordingly, the determining unit 102b of the control unit 102 determines whether the received mail 180 is the mail already received. The process corresponds to the process in step S125 shown in FIG. 6.

When the determining unit 102b determines that the value matching to the message number 182 (refer to FIG. 8) in the received mail 180 exists among the value 110b of the message number 110a of the specific information 110 (refer to FIG. 4) stored in the specific information storage unit 103a, the determining unit 102b determines that the received mail 180 is the mail already stored, and sends an instruction of restricting the process execution (referred to as a restriction instruction) to the process performing unit 102c. Then, the determining unit 102b discards (deletes) the subsequently received mail. The process corresponds to the process in step S126 shown in FIG. 6.

When the determining unit 102b determines that the value matching to the message number 182 (refer to FIG. 8) in the received mail 180 does not exist among the value 110b of the message number 110a of the specific information 110 (refer to FIG. 4) stored in the specific information storage unit 103a, the determining unit 102b determines that the received mail 180 is the non-received mail. Accordingly, the determining unit 102b does not send the restriction instruction, so that the process performing unit 102c performs the process on the subsequently received mail. In this case, the determining unit 102b stores the message number 182 of the received mail 180 (the identification mark, refer to FIG. 4) in the main storage unit 103c. The process corresponds to the process in step S130 shown in FIG. 6.

As described above, FIG. 9 shows the operation of the MFP 1 when the subsequently received mail is determined to be the non-received mail. Accordingly, in this case, the determining unit 102b determines the subsequently received mail as the mail to be processed. Note that even when the received mail 180 is not stored in the main storage unit 103c, the determining unit 102b determines the subsequently received mail as the mail to be processed.

In the next step, when the determining unit 102b determines the subsequently received mail as the mail to be processed, in response, the determining unit 102b determines whether the process contents with respect to the received mail 180 are the printing process according to the determining condition information 190 (refer to FIG. 11) stored in the determining condition storage unit 103b. The process corresponds to the process in step S135 shown in FIG. 6.

In the next step, when the determining unit 102b determines that the process contents with respect to the received mail 180 are the printing process, the determining unit 102b sends information indicating the printing process to the process performing unit 102c as the determination result of the process contents of the received mail 180. When the process performing unit 102c receives the information indicating the printing process, in response, the process performing unit 102c outputs the contents of the received mail 180 to the printing unit 104, so that the printing unit 104 prints an image thereof. The process corresponds to the process in step S140 shown in FIG. 6.

In the next step, when the determining unit 102b determines that the process contents with respect to the received mail 180 are the transmission process, the determining unit 102b sends information indicating the transmission process to the process performing unit 102c as the determination result of the process contents of the received mail 180. When the process performing unit 102c receives the information indicating the transmission process, in response, the process performing unit 102c converts the format of the mail main text of the received mail 180. Then, the process performing unit 102c sends the message number 182 of the received mail 180 and the mail 181 thus converted to the file server 4 through the transmission unit 105. The process corresponds to the process in step S145 shown in FIG. 6.

In the next step, when the process performing unit 102c detects the completion of the process (that is, the completion of the printing process with the printing unit 104 or the transmission process of the message number 182 and the mail 181 with the converted format with the transmission unit 105), in response, the process performing unit 102c sends the completion notice of the process to the mail deletion instructing unit 102d. When the mail deletion instructing unit 102d receives the completion notice of the process from the process performing unit 102c, in response, the mail deletion instructing unit 102d specifies the message number 182 of the received mail 180 with the process thus completed.

In step S265, the mail deletion instructing unit 102d sends a command such as "DELE 1" indicating the instruction of deleting the mail corresponding to the message number 182 to the mail server 2. The process corresponds to the process in step S150 shown in FIG. 6. The command "DELE 1" represents the instruction of deleting the mail with the message number 182 of "1".

In step S270, when the mail server 2 receives the command indicating the instruction of deleting the mail, in response, the mail server 2 sends a response such as "+OK Message 1 marked for Deletion" relative the command indication the instruction of deleting the mail to the MFP 1.

In the next step, when the MFP 1 (more specifically, the communication control unit 102a of the control unit 102) receives the response relative to the instruction of deleting the mail, in response, the communication control unit 102a deletes the message number 182 stored in the specific information storage unit 103a. The process corresponds to the process in step S155 shown in FIG. 6.

In step S280, the MFP 1 sends a command such as "QUIT" indicating connection termination to the mail server 2. When the mail server 2 receives the command indicating the connection termination from the MFP 1, in response, the mail server 2 sends a response such as "+OK" relative to the command indicating the connection termination to the MFP 1.

In the next step, the communication control unit 102a of the MFP 1 disconnects the TCP connection established with the mail server 2. In step S285, the communication control unit 102a sends a command such as "FIN" indicating the disconnection of the TCP connection to the mail server 2. In step S290, when the mail server 2 receives the "FIN" command from the MFP 1, in response, the mail server 2 sends a command "ACK" to the MFP 1. In step S295, the mail server 2 sends the command "FIN" to the MFP 1. In step S300, when the MFP 1 receives the command "FIN" from the mail server 2, in response, the MFP 1 sends the command "ACK" to the mail server 2, thereby completing the disconnection of the TCP connection. Through the steps described above, the control unit 102 of the MFP 1 completes the operation.

As described above, after step S260, the determining unit 102b of the control unit 102 determines whether the received mail 180 is the mail already received (refer to step S125 shown in FIG. 6). When the determining unit 102b determines that the received mail 180 is the mail already received, the MFP 1 performs step S275 after step S260 as shown in FIG. 10 without performing steps S265 and S270 (refer to FIG. 9). More specifically, the communication control unit 102a of the MFP 1 stops receiving the received mail 180. Other operation of the MFP 1 is similar to that shown in FIG. 9.

In the embodiment, the MFP 1 performs the printing process or the transmission process to the file server 4 on the received mail 180. Note that the MFP 1 is capable of performing other process (for example, a process of forwarding the received mail with another mail, a facsimile transmission process, a process of storing in the storage unit 103, and the like).

As described above, in the embodiment, the MFP 1 determines whether the received mail 180 received from the mail server 2 is the mail already received. Accordingly, it is possible to prevent the printing process and the like from redundantly performing on the received mail 180 more than once.

Second Embodiment

A second embodiment of the present invention will be explained. In the second embodiment, the MFP 1 does not perform steps S125 and S126 (refer to FIG. 6), and instead performs step S106 (refer to FIG. 12). In the second embodiment, the MFP 1 has a configuration similar to that of the MFP 1 in the first embodiment (refer to FIG. 2). An operation of the MFP 1 in the second embodiment different from that in the first embodiment will be explained, and explanations of similar steps are omitted.

Figure 12:
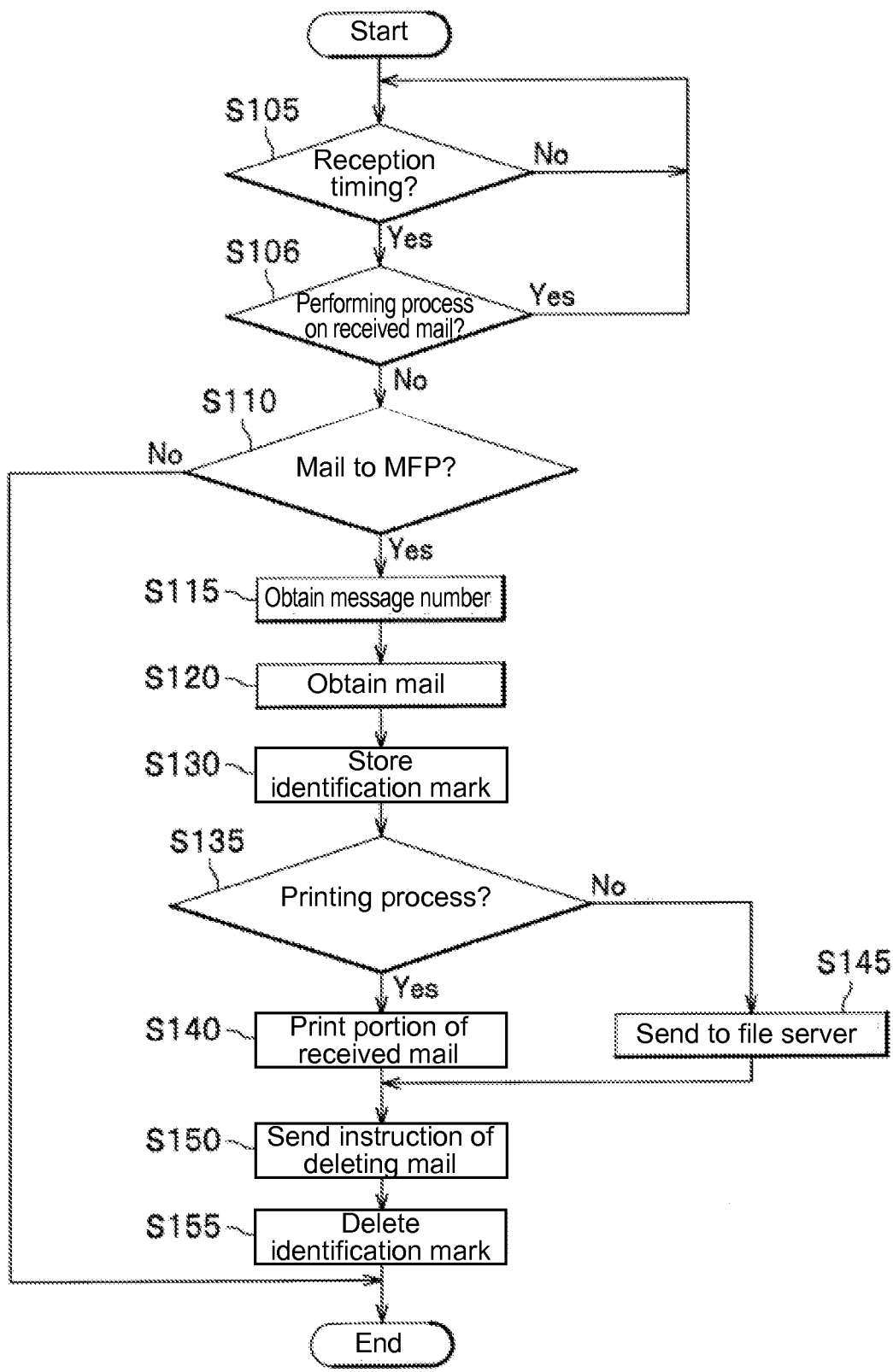
FIG. 12 is a flow chart showing an operation of an electric mail processing apparatus according to a second embodiment of the present invention.

The operation of the MFP 1 will be explained with reference to FIG. 12. FIG. 12 is a flow chart showing the operation of the electric mail processing apparatus according to the second embodiment of the present invention.

In the second embodiment, after step S105, in step S106, the communication control unit 102a of the control unit 102 (or the determining unit 102b or the process performing unit 102c) determines whether the process performing unit 102c is performing the process on the received mail 180. When the communication control unit 102a determines that the process performing unit 102c is performing the process on the received mail 180 (in the case of "Yes"), the operation returns to step S105. In this case, the communication control unit 102a (or the determining unit 102b or the process performing unit 102c) repeats steps S105 and S106 until the process performing unit 102c completes the process on the received mail 180.

When the communication control unit 102a determines that the process performing unit 102c is not performing the process on the received mail 180 (in the case of "No"), the operation proceeds to step S110. In step S110, the communication control unit 102a determines whether the mail to be sent to the MFP 1 is stored in the mail server 2.

In step S120, the communication control unit 102a receives the received mail 180. Then, the determining condition storage unit 103b performs step S130 without performing the steps S125 and S126 (refer to FIG. 6). In other words, the determining condition storage unit 103b does not determine whether the received mail 180 is the mail already received. Further, there is not the subsequently received mail, so that the determining condition storage unit 103b does not discard (delete) the subsequently received mail in step S126. Accordingly, in step S130, the determining condition storage unit 103b stores the identification mark immediately after step S120.

As described above, in the second embodiment, similar to the first embodiment, it is possible to prevent the printing process and the like from redundantly performing on the received mail 180 more than once. Further, in the second embodiment, the transmission of the mail to the mail server 2 is stopped while the control unit 102 is performing the process on the received mail 180, thereby eliminating unnecessary communication between the MFP 1 and the mail server 2.

In the embodiments described above, the present invention is not limited to the embodiments, and may be applicable to various modifications and alterations.

The disclosure of Japanese Patent Application No. 2009-001738, filed on Jan. 7, 2009, is incorporated in the application by the reference.

While the invention has been explained with reference to the specific embodiments of the invention, the explanation is illustrative and the invention is limited only by the appended claims.

What is claimed is:

1. An image forming apparatus, comprising:
   a communication control unit for receiving an electric mail stored in a mail server as a received mail;
   a mail storage unit for storing the received mail;
   an image forming unit for printing the received mail stored in the mail storage unit;
   a mail deletion instructing unit for sending a deletion instruction to the mail server so that the electric mail corresponding to the received mail is deleted from the mail server after the image forming unit prints the received mail; and
   a control unit for discarding a subsequently received mail newly received with the communication control unit when first identification information of the received mail stored in the mail storage unit corresponds to second identification information of the subsequently received mail so that the image forming unit does not print the subsequently received mail,
   wherein said first identification information is assigned by the mail server, and
   said second identification information is assigned by the mail server.

2. The image forming apparatus according to claim 1, wherein said communication control unit is configured to send an obtaining request of the electric mail at a specific interval to the mail server so that the communication control unit obtains the electric mail from the mail server as the received mail.

3. The image forming apparatus according to claim 1, wherein said communication control unit is configured not to obtain the subsequently received mail while the process performing unit is performing the specific process on the received mail.

4. The image forming apparatus according to claim 1, wherein said mail deletion instructing unit is configured to delete the received mail from the mail storage unit after the process performing unit completes performing the specific process on the received mail.

5. The image forming apparatus according to claim 1, wherein said communication control unit is configured to obtain the identification information for identifying the electric mail.

6. The image forming apparatus according to claim 5, wherein said communication control unit is configured to obtain the identification information for identifying the electric mail after the communication control unit receives the electric mail.

7. The image forming apparatus according to claim 5, further comprising an identification information storage unit for, storing the identification information of the received mail, said control unit being arranged to store the identification information of the subsequently received mail in the identification information storage unit when the identification information of the received mail is different from the identification information of the subsequently received mail.

8. The image forming apparatus according to claim 7, wherein said control unit is arranged to delete the identification information of the received mail from the identification information storage unit when the process performing unit completes performing the specific process on the received mail.

9. The image forming apparatus according to claim 1, further comprising a determining condition storage unit for storing a first correlation between a first transmission originator of the received mail and a first process to be performed with the process performing unit and a second correlation between a second transmission originator of the received mail and a second process to be performed with the process performing unit, said process performing unit being configured to refer to the determining condition storage unit to perform the first process or the second process corresponding to the first transmission originator or the second transmission originator of the received mail.

10. The image forming apparatus according to claim 9, wherein said determining condition storage unit is configured to store the correlation between the transmission originator of the received mail and the type of the process including a printing process on the received mail.

11. The image forming apparatus according to claim 9, wherein said determining condition storage unit is configured to store the correlation between the transmission originator of the received mail and the type of the process including a transmission process of the received mail to other device.

* * * * *